United States Patent [19]

Hatch et al.

[11] Patent Number: 5,291,355
[45] Date of Patent: Mar. 1, 1994

[54] MICRO MINIATURE HARD DISK DRIVE

[75] Inventors: Michael R. Hatch, Palo Alto; Ronald R. Moon, Los Gatos; Klaus-Peter Deyring; James A. McDonald, III, both of Scotts Valley; Thomas J. Huber, San Jose; Gregg J. Uhlendorf, Morgan Hill; Daniel E. Barnard, San Jose; Bryan T. Silbermann, Los Gatos; Philip L. Steiner, San Jose; Robert P. Cloutier, Campbell; Robert J. Kobliska, San Jose, all of Calif.

[73] Assignee: NEC Corporation, Tokyo, Japan

[21] Appl. No.: 850,443

[22] Filed: Mar. 10, 1992

[51] Int. Cl.$^5$ .............................. G11B 17/02
[52] U.S. Cl. ..................... 360/97.01; 360/99.08
[58] Field of Search .................. 360/97–99, 360/DIG. 900, 98.07, 99.04, 99.08

[56] References Cited

U.S. PATENT DOCUMENTS

| | | | |
|---|---|---|---|
| 4,568,988 | 2/1986 | McGinlay et al. | 360/77 |
| 4,982,296 | 1/1991 | Brown et al. | 360/77.03 |
| 5,025,335 | 6/1991 | Stefansky | 360/97.01 |
| 5,204,793 | 4/1993 | Plonczak | 360/97.01 |
| 5,223,993 | 6/1993 | Squires | 360/98.01 X |

OTHER PUBLICATIONS

"Integral Ships First . . .", Sep. 2, 1991, Electronic Eng. Times doc #69834.
"Startup to Introduce . . ." Sep. 2, 1991, PC Week, doc #70087.
"First Sub–Mini Hard Disk" Jan. 14, 1992, by C. Barr Integral Peripherals Inc.
"Comdex: Integral Peripherals . . ." by J. Mallory Oct. 24, 1991 Newsbytes Inc. 1991.
Preliminary Specifications/Datasheet, Mustang model 1820, Stingray model 1842, ©1991, Integral Peripherals, Inc.

*Primary Examiner*—John H. Wolff
*Attorney, Agent, or Firm*—Thomas E. Schatzel

[57] ABSTRACT

A hard disk drive for a computer system including a head disk assembly with a disk platter of approximately one-and-eight-tenths-inch in diameter capable of storing more than forty megabytes. In an embodiment, data tracks on each data surface of the platter are spaced at approximately 2,558 tracks per inch and each data track has approximately 36,000 flux changes per inch. An actuator positions a pair of read/write heads on each platter surface using a voice coil motor to position the heads over a cylinder. A magnetic actuator latch attaches to another magnet on the actuator and locks the heads in a parked position at the innermost diameter of the platter. A spindle motor rotates the platter at approximately 5,400 revolutions per minute. A base plate, with a gasketed surface and a raised lip, hermetically seals with a cover to the base plate such that the platter, the actuator, the actuator latch, and the spindle motor are all contained within. The cover carries a breather filter and recirculating air filter. The raised lip on the base plate prevents direct electrical interference from passing between the base plate and the cover.

5 Claims, 3 Drawing Sheets

MICRO MINIATURE HARD DISK DRIVE

CROSS-REFERENCE TO RELATED APPLICATIONS

SERVO SYSTEM FOR PROVIDING INCREASED RECORDING DENSITY AND IMPROVED OPERATION OF THE AGC CIRCUITRY, serial number [unknown], filed Mar. 10, 1992, inventors Ronald R. Moon, Gregg J. Uhlendorf and Daniel E. Barnard, assigned to assignee of the present invention; and ACTIVE MAGNETIC LATCH FOR DISK DRIVES, serial number [unknown], filed Mar. 10, 1992, inventors Michael R. Hatch and Ronald R. Moon, assigned to assignee of the present invention.

BACKGROUND OF THE INVENTION

1. Field of the Invention

The invention relates generally to computer systems and more specifically to hard disk drives with miniature disks of high storage capacity, e.g., one and eight tenths inch (1.8") diameter disks that store at least forty megabytes (40 MB).

2. Description of the Prior Art

Huge numeric computer systems constructed during World War II were used to crack secret German military codes. With the advance of technology, the same computing power can now be placed in a handheld computer that sells at commodity prices. The advances in electronics and semiconductor technology that made this possible brought business computing to a personal level, e.g., in the IBM PC, Apple Macintosh, and other personal computer systems. Recently, personal computing has seen the introduction of the battery-powered portable computer, the so-called laptop computer, the still smaller notebook computer, and even a palmtop computer that is so small that it fits in a person's hand.

While computers have been getting smaller in physical size, their memory and execution speeds have grown. To illustrate, one of the first operating systems for personal computers was called CP/M and marketed by Digital Research of Garden Grove, CA. The CP/M operating system ran on 64K bytes of main memory and used only one or two 250K byte eight-inch floppy disk drives. Today, certain laptop computer models, e.g., one by Apple Computer, Inc., require four megabytes of main memory and forty megabytes of built-in hard disk storage just to comfortably run Macintosh System-7 software system and a professional wordprocessor, e.g., Microsoft WORD.

As a result of progressive innovation, hard and floppy disk drives have been migrating to smaller diameter disks. In 1980, the eight-inch hard disk standard drive was popular. More storage was later offered in the five-and-a-quarter-inch (5.25") mini-drives. And subsequently, new demands for still smaller disk drives produced the three-and-a-half-inch (3.5") standard drive.

A typical micro-Winchester 3.5 inch drive is described in U.S. Pat. No. 4,568,988, issued Feb. 4, 1986, to McGinlay, et al. This micro-Winchester was developed to provide the storage capacity and interface of a 5.25" mini-drive. This was possible because track densities of six hundred tracks per inch (TPI) were not a problem to the more advanced head positioning servo systems using voice coil motors (VCM) instead of stepper motor positioning. Specially plated hard disk media were required by micro-Winchester drives, so an industry of disk media suppliers evolved that offered 3.5 inch media as a standard inventory item. This prompted scores of other disk drive manufacturers to also base designs on the 3.5 inch format.

The disk drive and media industry then settled on a two-and-a-half-inch (2.5") size for still further advances in micro miniaturization. This form factor allows a drive that has a length equal to the width of a 3.5 inch drive and a width one-half the length of a 3.5 inch drive. In other words, two 2.5 inch drives are capable of fitting within the space that a 3.5 inch drive typically requires. Drives of such size can be directly secured to printed circuit boards (PCBs), as opposed to the traditional panel and chassis mounting of standard sized drives. For example, the Apple Macintosh Powerbook 140 model 4/40, a laptop personal computer, uses a 2.5 inch forty megabyte hard disk drive similar to that described in U.S. Pat. No. 5,025,335, issued Jun. 18, 1991, to Stefansky. Closed-loop, embedded servo positioning systems are used, as well as head parking mechanisms to avoid having the heads slap against the data media areas while the laptop computer is being carried around and transported. Stefansky realized that further reductions in the size of disk drives would not be possible without redesigning certain components of the reduced size drive. The challenge in such invention lies in the reduction to practice, and not in the conception of a still smaller disk format. As Stefansky points out, the standard flexure used to mount heads on a load beam had to be changed to fit the smaller drives.

A one-and-eight-tenths-inch (1.8") hard disk drive recently became available. For example, Integral Peripherals, Inc. (Boulder, Colorado) markets two models, a twenty megabyte (20 MB) MUSTANG 1820 and a forty megabyte (40 MB) STINGRAY 1842. The forty megabyte storage capacity model incorporates a dual platter 1.8 inch design. Published datasheets comment that the MUSTANG 1820 and STINGRAY 1842 models are designed for use in subnotebook, pen-based and palmtop computers. The 1.8 inch format is purported to be one half the size and weight of 2.5 inch drives. A ramp head loading device allows the drive to be spun down to remove the heads from harms way. A lock keeps the heads parked in a safe place. The stated advantage of this is that the drive spins up to speed in less than one second with the heads parked. The following Table I summarizes the specifications for the MUSTANG 1820 and STINGRAY 1842 as published by Integral Peripherals, Inc.

TABLE I

|  |  | MUSTANG | STINGRAY |
|---|---|---|---|
| Formatted Capacity | Per Drive | 21.4 MB | 42.5 MB |
|  | Per Track | 8704 Bytes | 8704 Bytes |
|  | Per Sector | 512 Bytes | 512 Bytes |
|  | Sectors Per Track | 17 | 17 |
| Functional | Recording Density (BPI) | 46,100 | 46,100 |
|  | Flux Density (FCI) | 34,600 | 34,500 |
|  | Area Density (MB/sq in) | 89.5 | 89.5 |
|  | Disks | 1 | 2 |
|  | Data Heads | 2(4) | 4(5) |
|  | Data Cylinders | 615 | 977 |
|  | Track Density (TPI) | 1942 | 1942 |
|  | Recording Method | 1,7 RLL Code | 1,7 RLL Code |
| Performance | Media transfer Rate | 1.13 to 1.79 MB/sec | 1.13 to 1.79 MB/sec |

TABLE I-continued

| | | MUSTANG | STINGRAY |
|---|---|---|---|
| | Interface Transfer Rate | Up to 4.0 MB/sec | Up to 4.0 MB/sec |
| | Rotational Speed | 3,571 RPM | 3,571 RPM |
| | Latency | 8.5 ms | 8.5 ms |
| | Average Seek Time | <20 ms | <21 ms |
| | Track to Track Seek Time | 8 ms | 8 ms |
| | Maximum Seek Time | 30 ms | 30 ms |
| | Start Time (Typical) | 1.5 sec | 1.5 sec |
| | Buffer Size | 32K bytes | 32K bytes |
| | Interface | AT/XT | AT/XT |
| Reliability | MTBF | 100,000 hours | 100,000 hours |
| | Start/Stops | 1,000,000 | 1,000,000 |
| | Unrecoverable Data Error Rate | <1 per $10^{13}$ bits read | <1 per $10^{13}$ bits read |
| Power | 5 VDC ± 5%' Startup Current | 0.8 Amps | 0.8 Amps |
| | Typical Power Dissipation | | |
| | Spin-up | 3.5 watts | 3.8 watts |
| | Idle | 1.0 watts | 1.1 watts |
| | Read/Write/Seek | 2.0 watts | 2.1 watts |
| | Power Savings Mode | 0.5 watts | 0.6 watts |
| | Standby Mode | 0.035 watts | 0.035 watts |
| | Sleep Mode | 0.015 watts | 0.015 watts |
| Environmental | Temperature | | |
| | Operating | 5° C. to 55° C. | 5° C. to 55° C. |
| | Non-operating | −40° C. to 70° C. | −40° C. to 70° C. |
| | Relative Humidity (RH) | 10% to 90% non-condensing | 10% to 90% non-condensing |
| | Maximum Wet Bulb | 30° C. | 30° C. |
| | Shock (11 ms) | | |
| | Operating | 10 G | 10 G |
| | Non-operating | 200 G | 200 G |
| | Vibration (0 to peak) | | |
| | Operating | 2 G | 2 G |
| | Non-operating | 10 G | 10 G |
| | Altitude | | |
| | Operating | −1,000 to 10,000 feet | −1,000 to 10,000 feet |
| | Non-operating (maximum) | 40,000 feet | 40,000 feet |
| Physical | Stacked Configuration (HDA & PCB) | 15 mm × 51 mm × 77 mm | 15 mm × 51 mm × 77 mm |
| | Low Profile Configuration: | | |
| | Head Disk Assembly (HDA) | 10 mm × 51 mm × 70 mm | 12 mm × 51 mm × 70 mm |
| | Electronics Card (PCBA) | 7 mm × 51 mm × 77 mm | 7 mm × 51 mm × 77 mm |
| | Weight | <95 grams | <95 grams |

The ramp assembly in the Integral Peripheral drives confiscates the outermost diameter of the disk platters. In other designs, the passive latch design allows a magnetic bias that is too strong to permit data recording on the innermost data tracks. These areas are therefore not available for data recording, and severely limit storage capacity.

SUMMARY OF THE PRESENT INVENTION

It is therefore an object of the present invention to provide a head disk assembly with a single one-and-eight-tenths-inch hard disk platter capable of providing data storage capacity exceeding forty megabytes.

Briefly, an embodiment of the present invention is a head disk assembly (HDA) with a single disk platter approximately one-and-eight-tenths-inch (1.8") in diameter capable of storing more than forty megabytes. Data tracks on each data surfaces of the platter are spaced at approximately 2,558 tracks per inch (TPI). Each data track has approximately 36,000 flux changes per inch (FCI). An actuator positions a pair of read/write heads on each surface of the platter using a voice coil motor (VCM) to position the heads over a cylinder. An actuator latch with a movable magnet captures a ferrous member on the actuator to hold the heads in a parked position at the innermost diameter of the platter. A spindle motor rotates the platter at approximately 5,400 revolutions per minute (RPM). A base plate, with a gasketed surface and a raised lip, hermetically seals with a cover to the base plate such that the platter, the actuator, the actuator latch, and the spindle motor are all contained within. The cover has both a breather filter and recirculating air filter. The raised lip on the base plate prevents direct electrical interference from passing between the base plate and the cover.

An advantage of the present invention is that it provides a one-and-eight-tenths-inch hard drive capable of storing in excess of forty megabytes of data.

Another advantage of the present invention is that it provides a low profile drive.

These and other objects and advantages of the present invention will no doubt become obvious to those of ordinary skill in the art after having read the following detailed description of the preferred embodiment which is illustrated in the various drawing figures.

IN THE DRAWINGS

DETAILED DESCRIPTION OF THE PREFERRED EMBODIMENTS

Figure 1A:
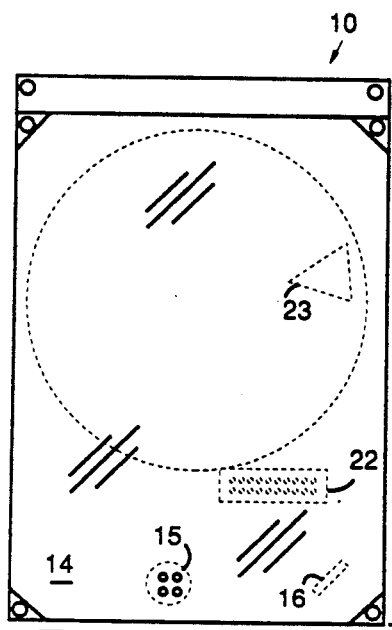
FIG. 1A is a top view of a head disk assembly of the present invention.
Figure 1B:
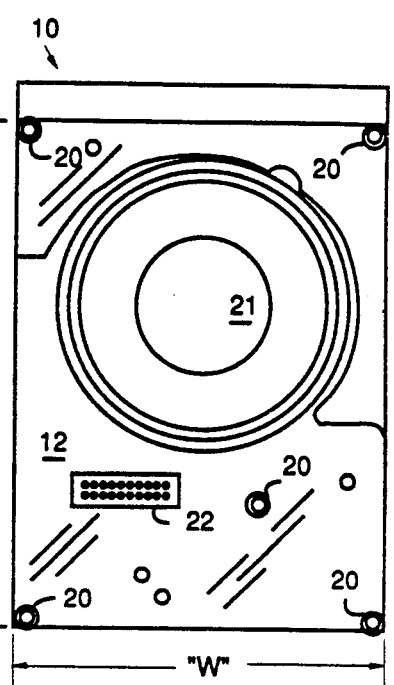
FIG. 1B is a bottom view of the head disk assembly of FIG. 1A.
Figure 1C:
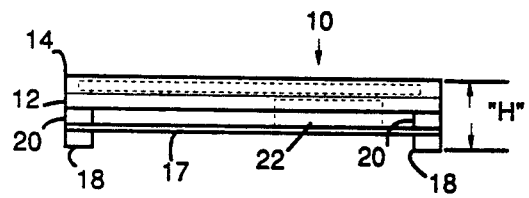
FIG. 1C is an end view of the head disk assembly of FIG. 1A and shows it mounted to a printed circuit card.

FIGS. 1A, 1B and 1C illustrate a head disk assembly (HDA) referred to by the general reference numeral 10 comprising a die-cast aluminum base plate 12, and a die-cast aluminum top cover 14. Top cover 14 includes a breather filter 15 and a recirculating air filter 16. Drive 10 is mounted to a printed circuit card (PCB) 17 and attached with a plurality of fasteners 18 to respective bosses 20 that are integral with the casting of base plate 12. A pancake spindle motor 21 hermetically seals and mounts to base plate 12. The length and width dimensions "L" and "W" of HDA 10 are approximately 70.00 mm long by 50.80 mm wide. Motor 21 may be in the form of the one made for such size disk drive by Nidec Corporation (Japan). A connector 22 connects HDA 10 to external disk controller circuitry (e.g., PCB 17). The height "H" between the bottom of fastener 18 to the top of cover 14 is approximately 12.50 mm. A triangularly shaped desiccant 23 is mounted between base plate 12 and cover 14. A system of recesses are included about the inside of cover 14 to provide the minimum clearances needed for internal components.

Figure 2:
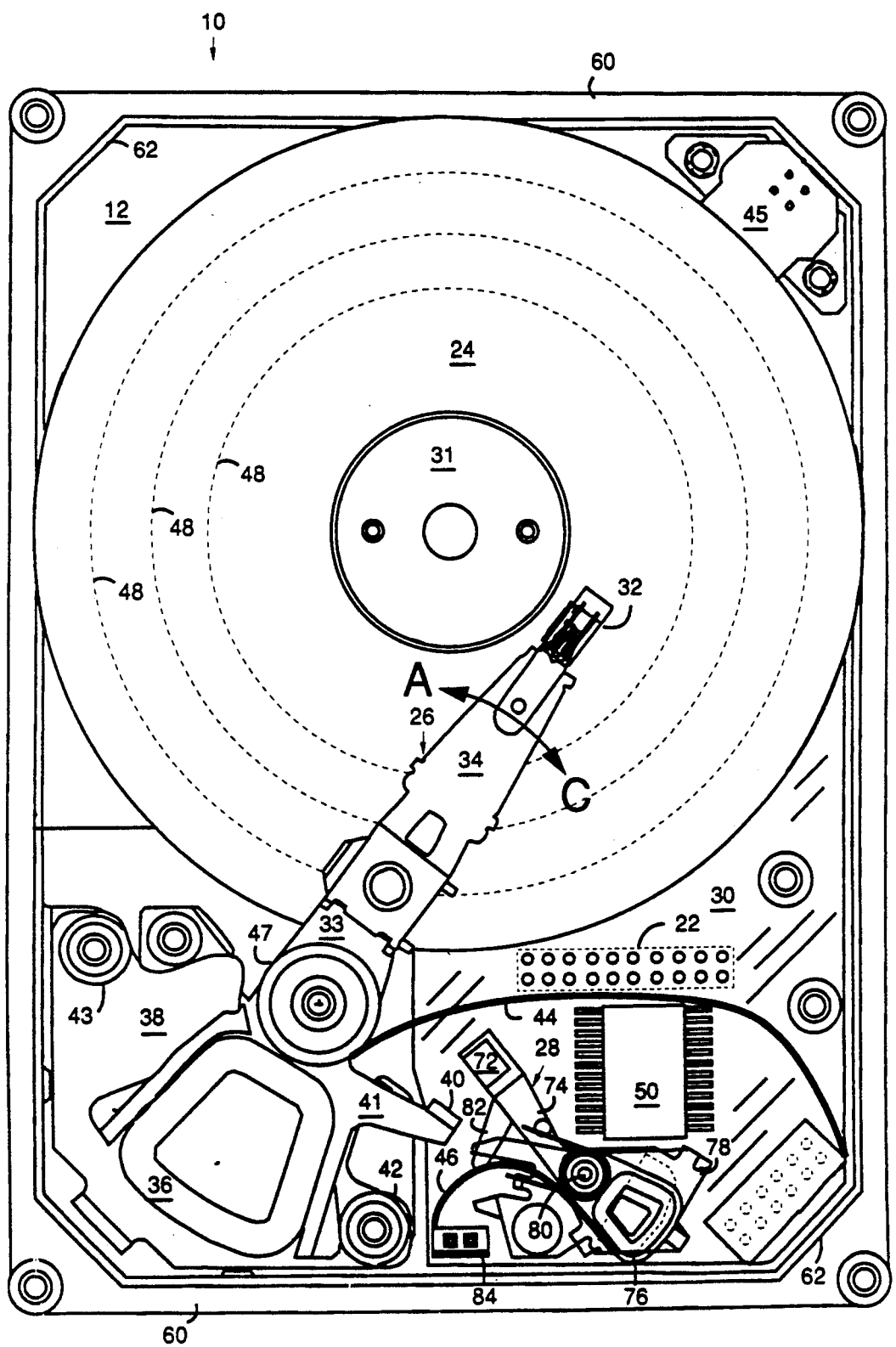
FIG. 2 is a top elevation of the head disk assembly of FIGS. 1A–1C with the cover removed to show the placement of the internal components.

FIG. 2 illustrates further components of HDA 10 including a single forty-eight millimeter (48 mm) diameter disk platter 24, an actuator assembly 26, an active latch assembly 28, and a rigid PCB 30. Data recording surfaces on platter 24 are preferably specified to be 1400 Oersteds and is available from Nashua Corporation (Santa Clara, Calif.) Hitachi Metal Technology (Freemont, Calif.) and Komag Corporation (Milpitas, Calif.). A disk clamp 31 holds platter 24 to spindle motor 21. Actuator assembly 26 includes a pair of read/write heads 32 attached to an actuator 33 with a pair of Hutchinson suspension 34, an actuator coil 36 that works with or against a lower magnetic plate 38, and a ferrous member 40 on a latch arm 41. Heads 32 are preferably model MC-50 as manufactured by Yamaha Corporation (Shizuoka-ken, Japan) or model R-90 as manufactured by Read-Rite Corporation (Milpitas, Calif.). Plate 38 and ferrous member 40 are made of a material that can be attracted to a magnet, such as iron alloys. Actuator coil 36, lower magnetic plate 38 and an upper magnetic plate (not shown, but parallel to plate 38) form a voice coil motor (VCM) that will move actuator assembly 26 back and forth. Heads 32 are Winchester type heads that load and unload against platter 24 in a parking area inside of any data tracks. The head type is also known in the art as contact start-stop (CSS). A pair of rubber crash stops 42 and 43 limit the rotation of actuator assembly 26. Crash stop 43 is removable such that it can be removed to allow the heads 32 to be unloaded and swung free of platter 24 (which is necessary to remove platter 24 from HDA 10). A first flex circuit 44 (shown on edge in FIG. 2) connects actuator coil 36 to PCB 30. A second flex circuit 45 connects spindle motor 21 (beneath platter 24 in FIG. 2) to PCB 30 (shown more completely in FIG. 4A). A third flex circuit 46 (also shown on edge in FIG. 2) connects a latch actuation coil in latch assembly 28 to PCB 30. Actuator assembly 26 rides on a cartridge ball bearing assembly 47 that is screwed into base plate 12. A plurality of concentric tracks 48 on both surfaces of platter 24 can have data that is read or written by read/write heads 32. In HDA 10 the stroke length is approximately 0.503 inches. The innermost track 48 is positioned at 0.45 inches (radius) and the outermost track is positioned at approximately 0.9 inches. These positions may be adjusted slightly to suit other constraints. There are sufficient tracks 48 per radial inch, in combination with the number of bits per inch, to yield a capacity at least forty megabytes per platter 24. A more detailed summary of function and performance is presented herein in Table II.

An integrated circuit (IC) 50 includes a preamplifier and is surface mounted to PCB 30. Connector 22 attaches to PCB 30 on the side opposite to the view shown in FIG. 2. Since PCB 30 is rigid, connector 22 is supported and a gasket is fitted around connector 22 to seal it and PCB 30 to base plate 12 to keep out dirt and humidity. Base plate 12 seals along a face 60 to cover 14 with a flat flexible gasket sandwiched between. A lip 62 adjacent to face 60 carries up beyond the gap between base plate 12 and cover 14 and serves to prevent a direct path for radiated electrical interference.

Figure 3A:
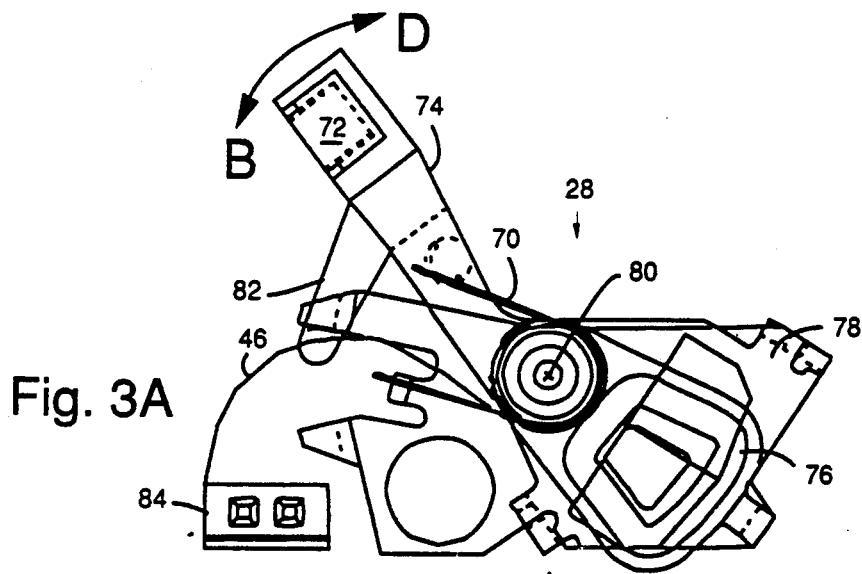
FIG. 3A is a top view of the actuator latch assembly of FIG. 2.
Figure 3B:
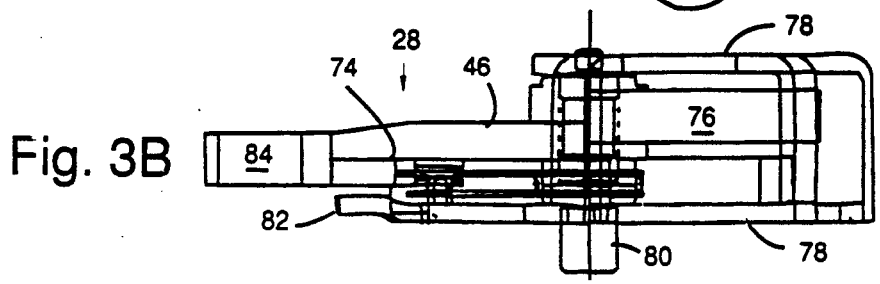
FIG. 3B is a side view of the actuator latch assembly of FIG. 3A.

FIGS. 3A and 3B illustrate that active latch assembly 28 is comprised of a spring 70, a magnet 72 on an arm 74, a VCM 76, a pair of magnetic plates 78, a pivot shaft 80, a pair of limit arms 82 on lower magnetic plate 78, and a connector 84 at the end of flex circuit 46.

In operation, when spindle motor 21 is shut off, a back electro-motive force (EMF) from motor 21 is used by VCM 36 to rotate actuator assembly 26 in a direction "A" (FIG. 2) and by VCM 76 to rotate latch assembly 28 in a direction "B" (FIG. 3A). Magnet 72 is attracted to ferrous member 40 and keeps arm 74 at the extreme of direction "B", thus locking actuator assembly 26 in a parked position such that heads 32 are inside the innermost of data tracks 48. When starting up from the parked position, a current is sent to VCM 36 which forces actuator assembly 26 in a direction "C" (FIG. 2), separating ferrous member 40 and magnet 72. This allows spring 70 to rotate latch assembly 28 in a direction "D" (FIG. 3A). Therefore ferrous meter 40 and magnet 72 separate enough that the magnetic bias between ferrous member 40 and magnet 72 does not interfere with seeks of heads 32 to the innermost of data tracks 48.

Figure 4A:
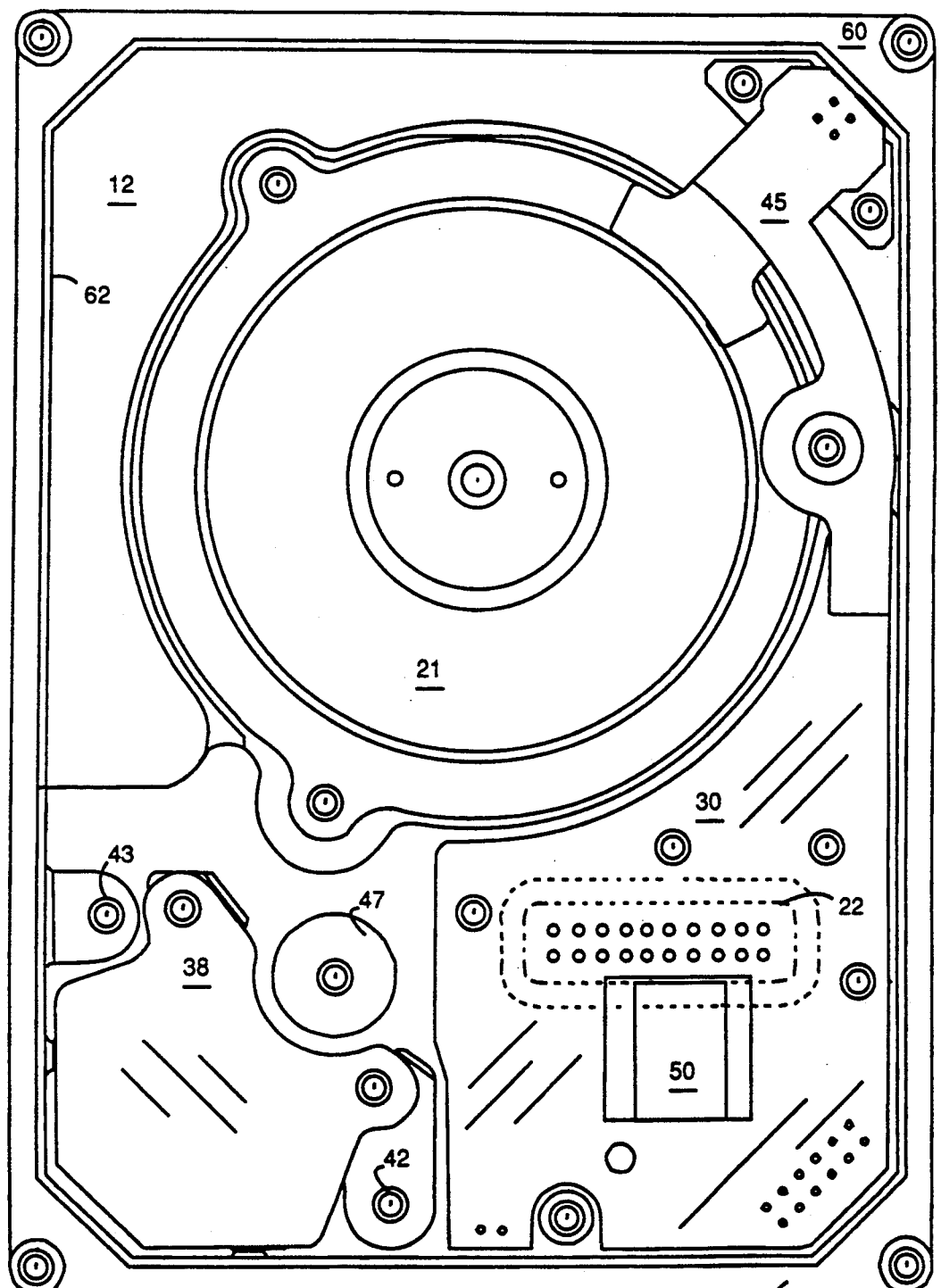
FIG. 4A is a top elevation of the head disk assembly of FIGS. 1A–1C with the cover, platter, actuator assembly and actuator latch assembly removed to show the placement of the internal components obscured by the platter, actuator assembly and actuator latch assembly in FIG. 2.
Figure 4B:
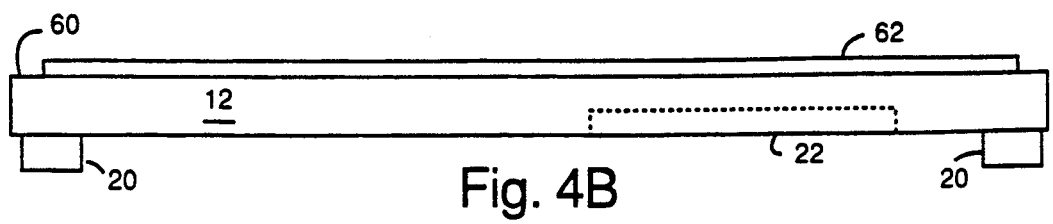
FIG. 4B is an end view of the head disk assembly of FIG. 4A.

FIGS. 4A and 4B illustrate HDA 10 without actuator assembly 26, platter 24 and latch assembly 28. The top, spindle side of motor 21 is illustrated. Flex circuit 45 is shown to extend to PCB 30 in the area underneath where platter 24 would otherwise be.

TABLE II

| | | |
|---|---|---|
| Formatted Capacity | Per Drive | 42.6M bytes |
| | Per Track | 19K bytes |
| Functional | Flux Density (FCI) | 36K |
| | Number of Platters | 1 |
| | Data Surfaces | 2 |
| | Data Tracks per Surface | 1,110 |
| | Track Density (TPI) | 2,558 |
| | Recording Method | 29 zones |
| Data Correction | ID Type | CRC |
| | ID Length | 17 bits |
| | Data Field Type | Reed-Solomon w/CRC |
| | Method | On-the-Fly and Programmed in Software |
| | Length (Reed Solomon) | 88 bits |
| | Length (CRC) | 16 bits |
| | Correction Length | |
| | On-the-Fly | |
| | Single Burst | 11 bits |
| | Two Bursts | none |
| | Software | |
| | Single Burst | 31 bits |
| | Two Bursts | 11 bits |
| | On-the-Fly Detection | |
| | Single Burst | 51 bits |
| | Triple Bursts | 11 bits |
| | On-the-Fly Miscorrection | 1 in $10^{20}$ bits |
| Performance | Data Rates | 12.6M to 24M bits/sec. |
| | Rotational Speed | 5,400 RPM |
| | Average Seek Time | 19 ms |
| | Track to Track Seek Time | 5 ms |
| | Maximum Seek Time | 40 ms |
| | Buffer Size | 32K bytes |
| | Interleave | 1:1 |
| | Interface | ATA/IDE |
| Reliability | MTBF | 1 in $10^7$ |

TABLE II-continued

| | | |
|---|---|---|
| | Recoverable Data | (no ECC) |
| | Error Rate | 1 in $10^9$ (ECC) |
| | Non-Recoverable Data | 1 in $10^{12}$ |
| | | (no ECC) |
| | Error Rate | 1 in $10^{13}$ (ECC) |
| | Non-Recoverable Seek | 1 in $10^6$ |
| Power | Startup | 3.5 watts |
| | Idle | 0.88 watts |
| | Read/Write/Seek | 2.1 watts |
| Environmental | Temperature | |
| | Operating | 5° C. to 55° C. |
| | Non-operating | −40° C. to 60° C. |
| | Humidity Range | |
| | Operating | 8% to 80% non-condensing |
| | Non-operating | 8% to 80% non-condensing |
| | Maximum Wet Bulb | 26° C. |
| | Shock (half sine) | 11 ms |
| | Operating | 100 G |
| | Non-operating | 10 G |
| | Vibration (peak to peak) | |
| | Operating | 1 G |
| | Non-operating | 10 G |
| | Altitude | |
| | Operating | −1000 feet to 10K feet |
| | Non-operating (maximum) | −1000 feet to 40K feet |
| Physical | Height | 12.7 mm |
| | Width | 50.8 mm |
| | Length | 70.0 mm (HDA) |
| | Weight | 90 grams |

HDA 10 has the capacity of storing over forty megabytes of data on the two surfaces of platter 24 as a result of writing data over a larger area of platter 24 and at a higher density than that of the prior art. Platter 24 is rotated by motor 21 at 5400 revolutions per minute (RPM). The rotational rate is limited to 5400 by both the increasing power consumed at higher speeds and how fast the integrated electronics can take the data. Present three-channel devices made by National Semiconductor (Santa Clara, Calif.) are about the fastest available, and faster devices that may be available in the future could allow rates higher than 5400 RPM if the power consumed by spindle motor 21 is not objectionable.

With 36K flux changes per inch (FCI) in data tracks 48, much higher amplitude signals are induced into read/write heads 32 during read operations because the rapid changes in magnetic field will induce higher voltages in the inductors of heads 32. A greater number of tracks per inch (TPI) are possible because the higher read amplitudes permit the magnetic track widths to be narrowed while maintaining acceptable flux change amplitudes. The number of tracks per inch is limited to about 2500 TPI and the number of flux changes per inch is limited to approximately 36,000 by the combination heads and platters that are presently available. No doubt, in time, heads and platters that improve on the preferred ones listed above for heads 32 and platter 24 will become commercially available. Such improvements will increase the storage capacity of HDA 10 substantially above forty megabytes, and are considered to be embraced by the present invention.

Since no part of the outermost diameter of platter 24 is usurped by a head unloading ramp as in the prior art, the outermost areas accommodate additional data tracks 48. The unique configuration of the actuator latch assembly 28 similarly allows the inner most diameter of platter 24 to accommodate additional data tracks 48. A low overhead servo encoding, which is described in detail one of the previously referenced copending applications and which are incorporated by reference herein, provides additional increases in the storage capacity of HDA 10. Briefly, the low overhead servo recording technique increases the data storage capacity of each data track 48 by encoding a complete eleven-bit sector address in only one of every seven sectors on a track 48 and an abbreviated four-bit sector address in the other six of the seven sectors. There are typically sixty-four sectors per track 48. The savings in sector overhead is used to add additional data sectors to each data track 48 for more data capacity. The number of bits used for a complete sector address is a function of the number of sectors in a track 48, and the number of bits that can be used in an abbreviation is a function of the ratio of sectors with complete sector addresses to sectors with abbreviated sector addresses. Therefore, variations on the number of bits and the ratios used will no doubt provide the above described benefits of the present invention. For example, track addresses can be similarly abbreviated in a majority of tracks 48.

Although the present invention has been described in terms of the presently preferred embodiments, it is to be understood that the disclosure is not to be interpreted as limiting. Various further alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A head disk assembly (HDA) for magnetically recording data, comprising:

a spindle motor connected to provide rotation of a fixed hard disk media and having a back electromotive force (EMF) output that produces a voltage when power to the spindle motor is shut off;

an actuator assembly connected to provide random access of a magnetic read/write head across a surface of said hard disk media and including a pair of read/write heads attached to an actuator with a pair of suspensions, an actuator coil attached to said actuator for repulsing and attracting a lower magnetic plate, an upper magnetic plate and a ferrous member on a latch arm attached to said actuator, wherein said actuator coil, lower magnetic plate and upper magnetic plate form a first voice coil motor (VCM) that provides for moving the actuator assembly with said voltage from said EMF output; and an active actuator latch assembly positioned proximate to the actuator assembly and including a magnet on an arm mounted on a pivot shaft and held in one extreme position of rotation by a spring, a second voice coil motor (VCM) connected to rotate said arm against said spring, a pair of magnetic plates within magnetic reach of said VCM, and a pair of limit arms to limit the range of rotation of said arm on said pivot, wherein the actuator assembly may be positively latched in a parked position by rotating said arm such that said magnet comes in contact with said ferrous member on the actuator assembly in a parked position after the power of said spindle motor is shut off.

2. The HDA of claim 1, wherein:
the active actuator latch assembly and actuator assembly are mutually positioned, and said ferrous member on the actuator assembly and said magnet on the active actuator latch assembly are located on their respective assemblies, to come into contact at a point that holds the actuator assembly in a parking position in which the actuator assembly has radially moved a recording head to a position on said fixed hard disk media that is within an area defined for a plurality of data recording tracks.

3. The HDA of claim 2, wherein:
the active actuator latch includes a latch activation coil positioned proximate to said latch assembly arm for magnetically rotating said arm to release a contact of said magnet on the latch assembly from said ferrous member on the actuator assembly and to thereby allow the actuator to move a recording head to a non-parking position on said fixed hard disk media that is within an area defined for a plurality of data recording tracks.

4. The HDA of claim 1, wherein:
the active actuator latch includes magnetic means connected to said arm for clamping the actuator assembly and locking it in a parked position at an innermost diameter of said fixed hard disk media.

5. The HDA of claim 1, wherein:
the actuator latch comprises a motor connected to said arm for moving the actuator last assembly within reach of said magnetic means to mechanically capture the actuator.

* * * * *

UNITED STATES PATENT AND TRADEMARK OFFICE
CERTIFICATE OF CORRECTION

PATENT NO.  : 5,291,355

DATED       : March 1, 1994

INVENTOR(S) : M.R. Hatch, et al.

It is certified that error appears in the above-identified patent and that said Letters Patent is hereby corrected as shown below:

ON THE TITLE PAGE, ITEM [75] INVENTORS;

ADD AS AN ADDITIONAL INVENTOR JOHN C. SCOTT, ATHERTON, CALIFORNIA

Signed and Sealed this

Twelfth Day of July, 1994

Attest:

BRUCE LEHMAN

Attesting Officer

Commissioner of Patents and Trademarks